(12) United States Patent
Dobashi et al.

(10) Patent No.: US 11,575,841 B2
(45) Date of Patent: Feb. 7, 2023

(54) INFORMATION PROCESSING APPARATUS, IMAGING APPARATUS, METHOD, AND STORAGE MEDIUM

(71) Applicant: CANON KABUSHIKI KAISHA, Tokyo (JP)

(72) Inventors: Toshiyuki Dobashi, Kanagawa (JP); Keiichi Yamamoto, Kanagawa (JP); Seiya Ohta, Kanagawa (JP); Shunsuke Chino, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/200,182

(22) Filed: Mar. 12, 2021

(65) Prior Publication Data

US 2021/0289119 A1    Sep. 16, 2021

(30) Foreign Application Priority Data

Mar. 16, 2020 (JP) .............................. JP2020-045744
Oct. 30, 2020 (JP) .............................. JP2020-181986

(51) Int. Cl.
*H04N 5/235*    (2006.01)
*G06V 10/22*    (2022.01)
*G06V 40/10*    (2022.01)
*G06V 40/16*    (2022.01)

(52) U.S. Cl.
CPC ........... *H04N 5/2353* (2013.01); *G06V 10/22* (2022.01); *G06V 40/10* (2022.01); *G06V 40/166* (2022.01)

(58) Field of Classification Search
CPC ..................................................... H04N 5/2353
USPC ....................................................... 348/222.1
See application file for complete search history.

(56) References Cited

U.S. PATENT DOCUMENTS

2007/0147701 A1* 6/2007 Tanaka ............... H04N 5/23219
                                                              348/E5.038
2016/0205307 A1   7/2016 Kosaka

FOREIGN PATENT DOCUMENTS

JP    2008170932 A    7/2008
JP    2015130615 A    7/2015
JP    2017092544 A    5/2017
WO    2018/228467 A1  12/2018

* cited by examiner

*Primary Examiner* — Joel W Fosselman
(74) *Attorney, Agent, or Firm* — Canon U.S.A., Inc. IP Division (57) ABSTRACT

There is provided with an information processing apparatus. An acquisition unit acquires a captured image. A human body detection unit detects a human body area from the image. A first exposure determination unit determines exposure based on luminance of the human body area detected by the human body detection unit. A face detection unit detects a face area from an image captured at the exposure determined by the first exposure determination unit. A second exposure determination unit determines exposure based on luminance of the face area detected by the face detection unit and to maintain the exposure until a predetermined condition is satisfied.

12 Claims, 10 Drawing Sheets

FIG.7A
DETECTION EXAMPLE OF FACE AREA

FIG.7B
DETECTION EXAMPLE OF HUMAN BODY AREA

INFORMATION PROCESSING APPARATUS, IMAGING APPARATUS, METHOD, AND STORAGE MEDIUM

BACKGROUND OF THE INVENTION

Field of the Disclosure

The present invention relates to an information processing apparatus, an imaging apparatus, a method, and a storage medium.

Description of the Related Art

A technology that detects a face area of an object from a captured image and adjusts image quality of the captured image based on information about the face area has been known (see Japanese Patent Application Laid-Open No. 2017-092544).

SUMMARY OF THE DISCLOSURE

According to one embodiment of the present disclosure, an information processing apparatus is provided and includes an acquisition unit configured to acquire a captured image; a human body detection unit configured to detect a human body area from the image; a first exposure determination unit configured to determine exposure based on luminance of the human body area detected by the human body detection unit; a face detection unit configured to detect a face area from an image captured at the exposure determined by the first exposure determination unit; and a second exposure determination unit configured to determine exposure based on luminance of the face area detected by the face detection unit and to maintain the exposure until a predetermined condition is satisfied.

According to another embodiment of the present disclosure, a method is provided and includes acquiring captured image; detecting a human body area from the image; determining exposure based on luminance of the detected human body area; detecting a face area from an image captured at the determined exposure; and determining exposure based on luminance of the detected face area and maintaining the exposure until a predetermined condition is satisfied.

Further features of the present invention will become apparent from the following description of embodiments with reference to the attached drawings.

DESCRIPTION OF THE EMBODIMENTS

Embodiments of the present invention are described in detail below with reference to the drawings. The following embodiments do not limit the present invention, and all of combinations of features described in the embodiments are not necessarily essential for solving means of the present invention. Configurations of the embodiments can be appropriately corrected or modified depending on a specification of an apparatus to which the present invention is applied and various kinds of conditions (use condition, use environment, etc.). The technical scope of the present invention is defined by claims and is not limited by the following individual embodiments. Further, parts of the embodiments described below may be appropriately combined with one another.

One or more of functional blocks illustrated in the drawings described below may be implemented by hardware such as an application specific integrated circuit (ASIC) and a programmable logic array (PLA), or may be implemented through execution of software by a programmable processor such as a central processing unit (CPU) and a micro processing unit (MPU).

Further, one or more of the functional blocks may be implemented by a combination of software and hardware. Thus, in the following description, even in a case where different functional blocks are described as main executors of operation, the functional blocks can be implemented by the same hardware as the main executor.

First Embodiment (Basic Configuration)

Figure 1:
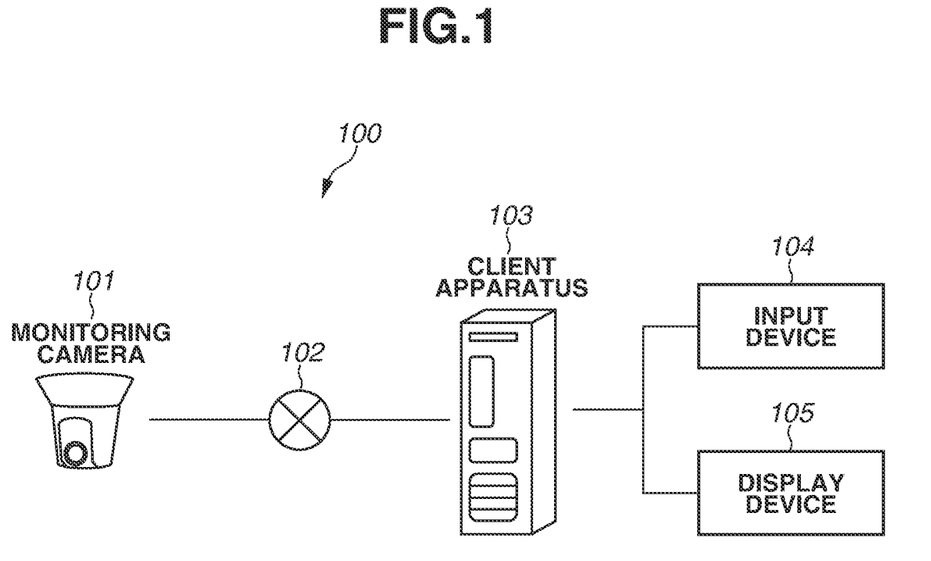
FIG. 1 is a block diagram illustrating a configuration of an imaging control system according to a first embodiment of the present invention.

FIG. 1 is a diagram illustrating a configuration of an imaging control system 100 according to a first embodiment of the present invention.

The imaging control system 100 includes a monitoring camera 101, a network 102, a client apparatus 103, an input device 104, and a display device 105. The monitoring camera 101 is an imaging apparatus that acquires a moving image and can perform imaging of an object and image processing. The monitoring camera 101 and the client apparatus 103 are communicably connected to each other via the network 102. The client apparatus 103 is communicably connected with the input device 104 and the display device 105. The client apparatus 103 is an apparatus that processes various information (information processing apparatus). The client apparatus 103 also functions as an imaging control apparatus that controls imaging by the monitoring camera 101.

The input device 104 includes a mouse and/or a keyboard, and is operated by a user of the client apparatus 103.

The display device 105 is a device including a monitor that displays an image received from the client apparatus 103. The display device 105 can also function as a user interface (UI) such as a touch panel. In this case, the display device 105 also functions as an input device for inputting an instruction, information, data, etc. to the client apparatus 103.

In FIG. 1, the client apparatus 103, the input device 104, and the display device 105 are illustrated as apparatuses independent of one another; however, the present embodiment is not limited to such a configuration. For example, the client apparatus 103 and the display device 105 may be integrated, or the input device 104 and the display device 105 may be integrated. Alternatively, the client apparatus 103, the input device 104, and the display device 105 may be integrated. In a case where the client apparatus 103 and the display device 105 are integrated, an integrated apparatus takes a form of, for example, a personal computer, a tablet terminal, or a smartphone.

(Configuration of Monitoring Camera)

Figure 2:
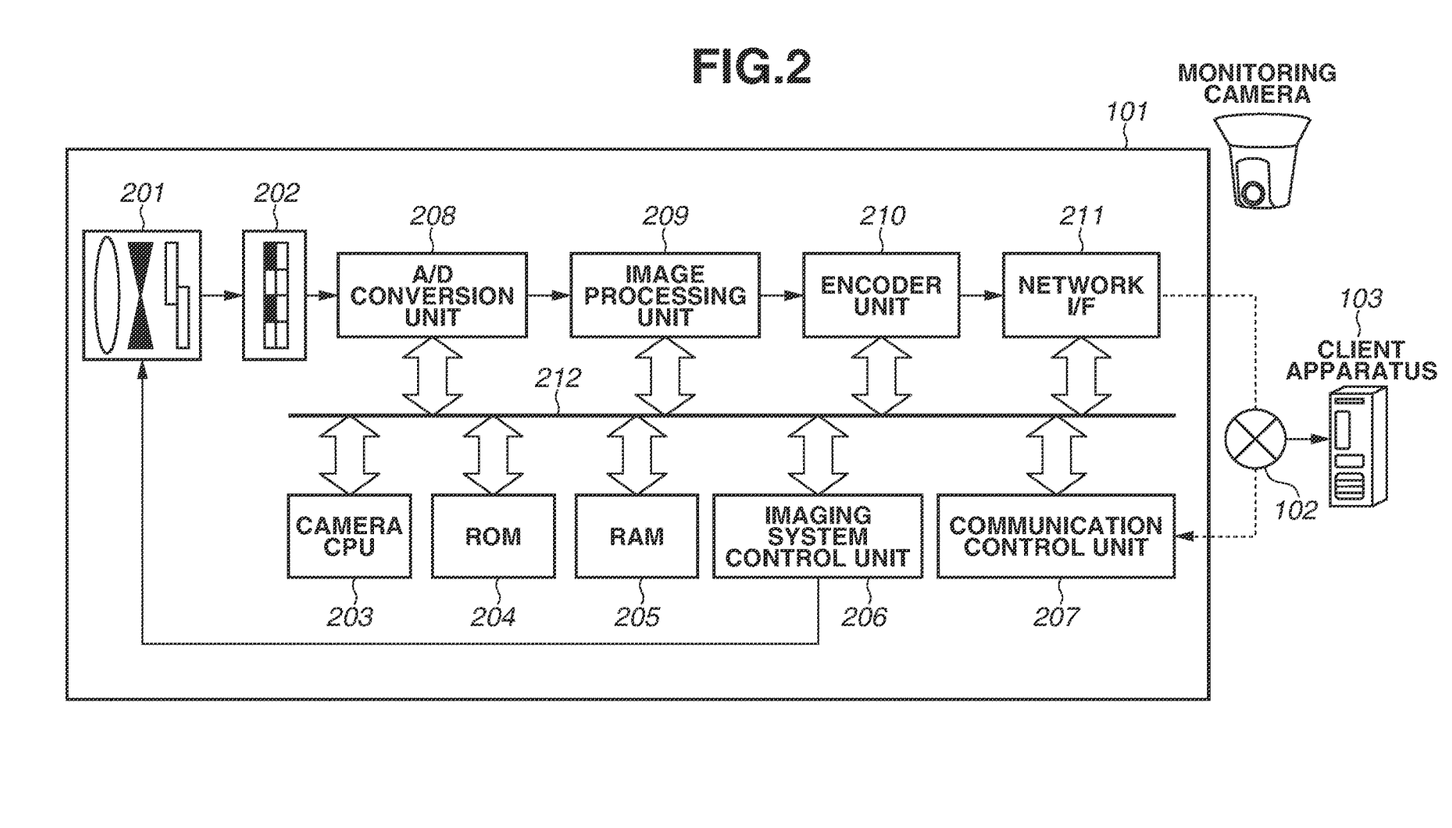
FIG. 2 is a block diagram illustrating an internal configuration of a monitoring camera according to the first embodiment.

FIG. 2 is a block diagram illustrating an internal configuration of the monitoring camera 101. The monitoring camera 101 includes an imaging optical system 201, an imaging device 202, a camera CPU 203, a read only memory (ROM) 204, a random access memory (RAM) 205, an imaging system control unit 206, a communication control unit 207, an analog/digital (A/D) conversion unit 208, an image processing unit 209, an encoder unit 210, and a network interface (I/F) 211. The units (203 to 211) of the monitoring camera 101 are connected to one another via a system bus 212.

The imaging optical system 201 is an optical component group that includes a zoom lens, a focus lens, a shake correction lens, a diaphragm, and a shutter, and collects optical information about the object. The imaging optical system 201 is connected to the imaging device 202.

The imaging device 202 is a charge-accumulation solid-state imaging device such as a complementary metal-oxide semiconductor (CMOS) imaging device and a charge-coupled device (CCD) imaging device that converts a light flux collected by the imaging optical system 201 into a current value (signal value). The imaging device 202 acquires color information in combination with a color filter or the like. The imaging device 202 is connected to the A/D conversion unit 208.

The camera CPU 203 is a control unit that integrally controls operation of the monitoring camera 101. The camera CPU 203 reads a command stored in the ROM 204 or the RAM 205 and performs processing based on a result of the reading.

The imaging system control unit 206 controls the components of the monitoring camera 101 based on an instruction from the camera CPU 203. For example, the imaging system control unit 206 performs control such as focus control, shutter control, and diaphragm control in the imaging optical system 201.

The communication control unit 207 performs control to transmit, to the camera CPU 203, a control command (control signal) from the client apparatus 103 to each of the components of the monitoring camera 101 through communication with the client apparatus 103.

The A/D conversion unit 208 converts a light quantity of the object detected by the imaging device 202 into a digital signal (image data). The A/D conversion unit 208 transmits the digital signal to the image processing unit 209.

The image processing unit 209 performs image processing on the image data including the digital signal received from the imaging device 202. The image processing unit 209 is connected to the encoder unit 210.

The encoder unit 210 performs processing to convert the image data processed by the image processing unit 209 into data in a file format such as Motion JPEG, H.264, or H.265. The encoder unit 210 is connected to the network I/F 211.

The network I/F 211 is an interface used for communication with an external apparatus such as the client apparatus 103 via the network 102, and is controlled by the communication control unit 207.

The network 102 is an internet protocol (IP) network connecting the monitoring camera 101 with the client apparatus 103. The network 102 includes a plurality of routers, switches, and cables compatible with a communication standard such as Ethernet®. In the present embodiment, the communication standard, the scale, and the configuration of the network 102 are not limited as long as the network 102 allows for the communication between the monitoring camera 101 and the client apparatus 103. Examples of the network 102 include the Internet, a wired local area network (LAN), a wireless LAN, and a wide area network (WAN).

(Configuration of Client Apparatus)

Figure 3:
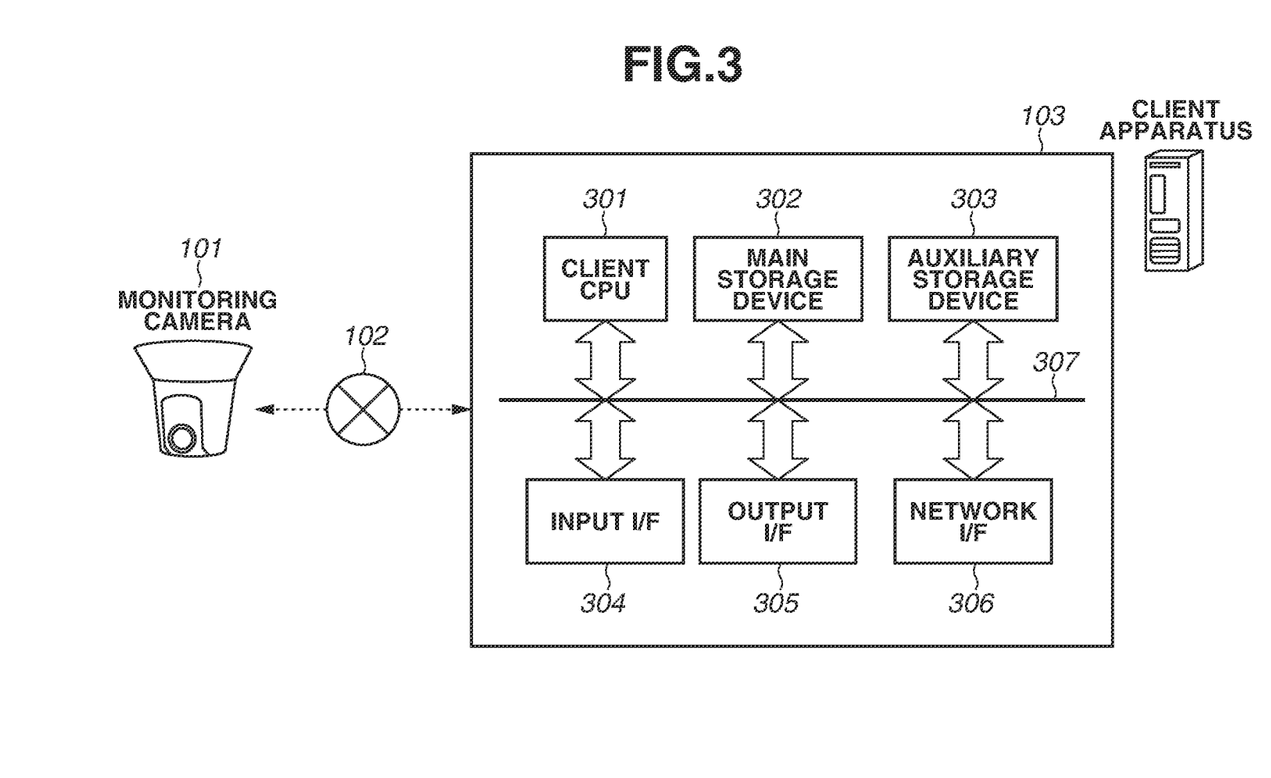
FIG. 3 is a block diagram illustrating an internal configuration of a client apparatus according to the first embodiment.

FIG. 3 is a block diagram illustrating an internal configuration of the client apparatus 103.

The client apparatus 103 includes a client CPU 301, a main storage device 302, an auxiliary storage device 303, an input I/F 304, an output I/F 305, and a network I/F 306. The elements of the client apparatus 103 are communicably connected with one another via a system bus 307.

The client CPU 301 is a central processing unit integrally controlling operation of the client apparatus 103. The client CPU 301 may integrally control the monitoring camera 101 via the network 102.

The main storage device 302 is a storage device such as a RAM that functions as a temporary storage area for data for the client CPU 301. For example, the main storage device 302 stores in advance a pattern (pattern corresponding to a face feature portion and a human body feature portion) for pattern matching used when the client apparatus 103 performs face detection and human body detection.

The auxiliary storage device 303 is a storage device such as a hard disk drive (HDD), a ROM, or a solid state device (SSD) that stores various kinds of programs and various kinds of setting data.

The input I/F 304 is an interface used when the client apparatus 103 receives input (signal) from the input device 104 or other devices.

The output I/F 305 is an interface used when the client apparatus 103 outputs information (signal) to the display device 105 or other devices.

The network I/F 306 is an interface used for communication with the external apparatus such as the monitoring camera 101 via the network 102.

Figure 4:
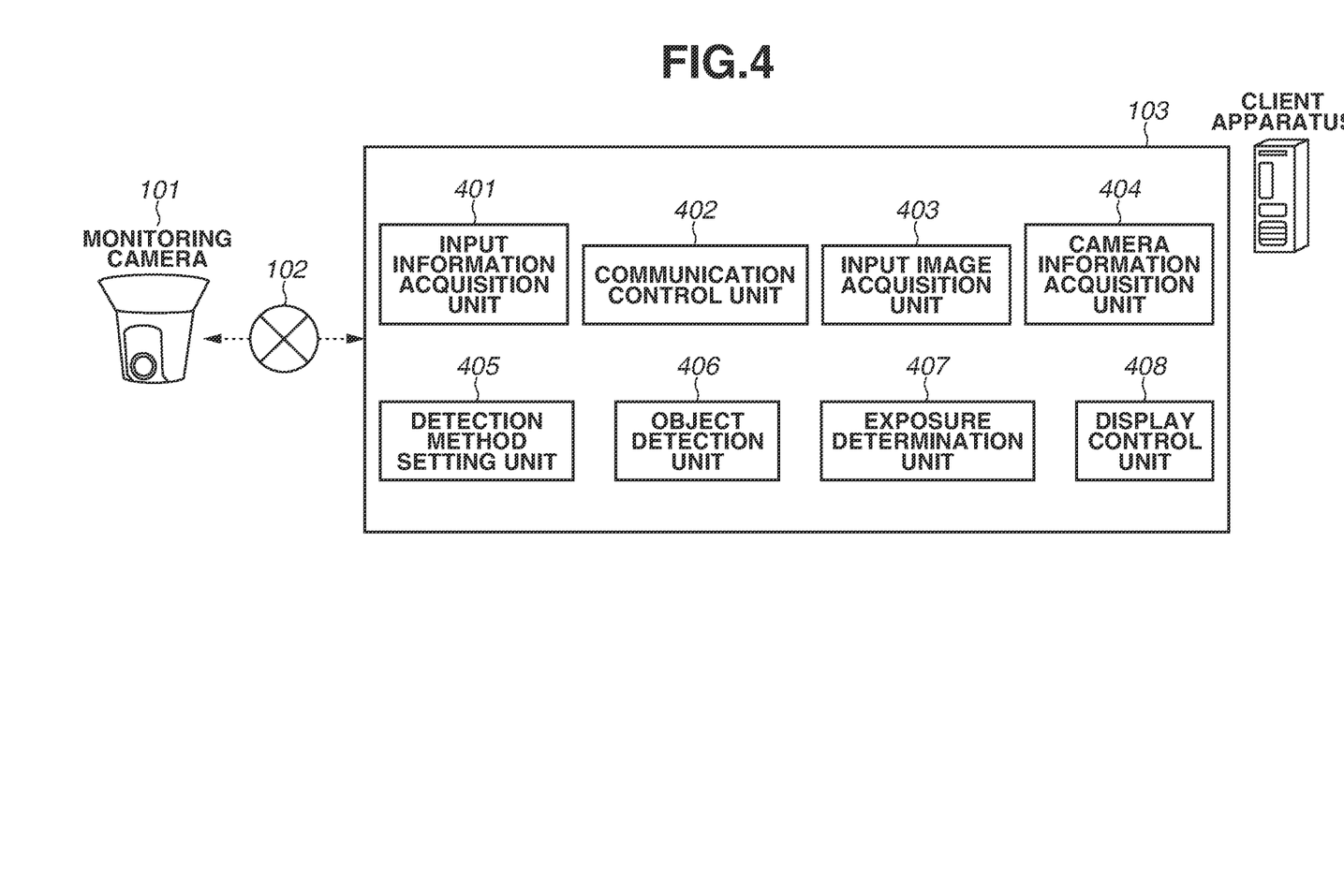
FIG. 4 is a diagram illustrating functions and configurations performed by the client apparatus.

When the client CPU 301 performs processing based on the programs stored in the auxiliary storage device 303, functions and processing of the client apparatus 103 illustrated in FIG. 4 are implemented. Details of the functions and the processing of the client apparatus 103 are described below.

(Functions of Client Apparatus)

FIG. 4 is a diagram illustrating the functions performed by the client apparatus 103. In other words, units (functional blocks) illustrated in FIG. 4 are functions that can be performed by the client CPU 301.

As illustrated in FIG. 4, the client CPU 301 of the client apparatus 103 includes an input information acquisition unit 401, a communication control unit 402, an input image acquisition unit 403, a camera information acquisition unit 404, and a detection method setting unit 405. The client CPU 301 further includes an object detection unit 406, an exposure determination unit 407, and a display control unit 408. The client apparatus 103 may perform the functions of the units 401 to 408 illustrated in FIG. 4 by hardware (or software) different from the client CPU 301.

The input information acquisition unit 401 receives input from the user via the input device 104.

The communication control unit 402 performs control to receive an image transmitted from the monitoring camera 101 (image captured by monitoring camera 101) via the network 102. The communication control unit 402 further performs control to transmit a control command from the client apparatus 103 to the monitoring camera 101 via the network 102.

The input image acquisition unit 403 acquires the image transmitted from the monitoring camera 101 via the communication control unit 402 as a target image of object detection processing (an image to which object detection processing is applied). Details of the object detection processing are described below.

The camera information acquisition unit 404 acquires camera information (imaging information) about the monitoring camera 101 capturing an image of the object via the communication control unit 402. The camera information (imaging information) is various information related to imaging of the object and to acquire an image. Examples of the camera information include an exposure parameter such as an aperture value.

The detection method setting unit 405 sets a predetermined (appropriate) detection method for the image acquired by the input image acquisition unit 403 among various detection methods including detection of a face area (face detection) and detection of a human body area (human body detection). In a case where the face detection is performed, the object detection unit 406 described below preferentially detects a face area in the image. In a case where the human body detection is performed, the object detection unit 406 preferentially detects a human body area in the image.

In the present embodiment, the detection method setting unit 405 sets (selects) the detection method that is the face detection or the human body detection. However, the present embodiment is not limited to such setting. For example, a detection method of detecting a partial feature area of a person, such as an upper body, a head, and eyes, a nose, and a mouth of the face, may be set (selected).

Further, in the present embodiment, the object to be detected is a person; however, a specific area of a predetermined object other than a person may be detected. The predetermined object preset by the client apparatus 103, such as a face of an animal or an automobile, may be detected.

The exposure determination unit 407 determines an exposure value based on image information about the object area obtained from the object detection unit 406. The communication control unit 402 transmits (outputs) the above-described exposure value to the monitoring camera 101. Then, the exposure control (exposure adjustment) is performed via the communication control unit 207. A detailed processing flow relating to the camera information acquisition unit 404, the detection method setting unit 405, the object detection unit 406, and the exposure determination unit 407 is described below with reference to a flowchart of FIG. 5.

The display control unit 408 outputs the captured image on which an exposure correction determined by the exposure determination unit 407 is reflected to the display device 105 in response to an instruction from the CPU 301.

(Object Detection Processing and Exposure Determination Processing)

The exposure control processing according to the present embodiment is described below with reference to the flowchart of FIG. 5.

In the imaging control system 100 in FIG. 1, the monitoring camera 101, the client apparatus 103, the input device 104, and the display device 105 have been turned on, and connection (communication) between the monitoring camera 101 and the client apparatus 103 has been established.

In this state, imaging of the object, transmission of image data from the monitoring camera 101 to the client apparatus 103, and image display on the display device 105 are repeated at a predetermined updating cycle by the monitoring camera 101.

Figure 5:
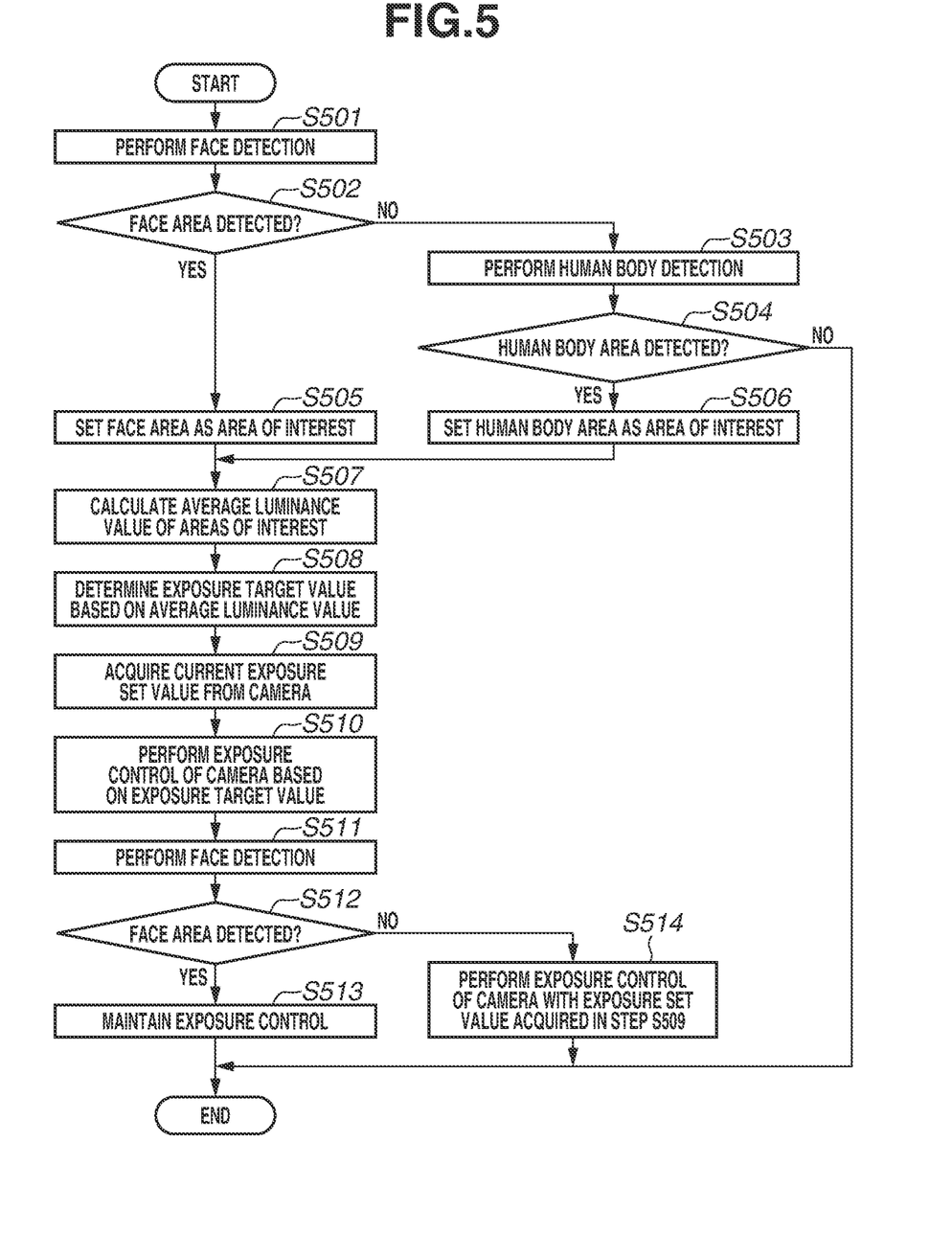
FIG. 5 is a flowchart illustrating exposure control processing according to the first embodiment.

The processing of the flowchart in FIG. 5 is started by the client CPU 301 in response to input of the captured image of the object from the monitoring camera 101 to the client apparatus 103 via the network 102.

First, in step S501, the detection method setting unit 405 sets face detection to the object detection unit 406, and the object detection unit 406 performs face detection processing on the input image. The main storage device 302 of the client apparatus 103 stores in advance patterns corresponding to face feature portions and human body feature portions. The object detection unit 406 detects a face area by performing pattern matching based on the patterns.

Next, in step S502, the object detection unit 406 determines whether a face area is detected in the image by the face detection processing performed in step S501. In a case where no face area is detected (NO in step S502), the processing proceeds to step S503. In a case where at least one or more face areas are detected (YES in step S502), the processing proceeds to step S505.

In step S503, the detection method setting unit 405 sets human body detection to the object detection unit 406, and the object detection unit 406 performs human body detection processing on the input image.

In the face detection, the face area cannot be accurately detected if a direction, a size, and brightness of the face are not suitable for the face detection, whereas in the human body detection, an area where a person is present can be detected irrespective of the direction, the size, and the brightness of the face.

Figure 7A:
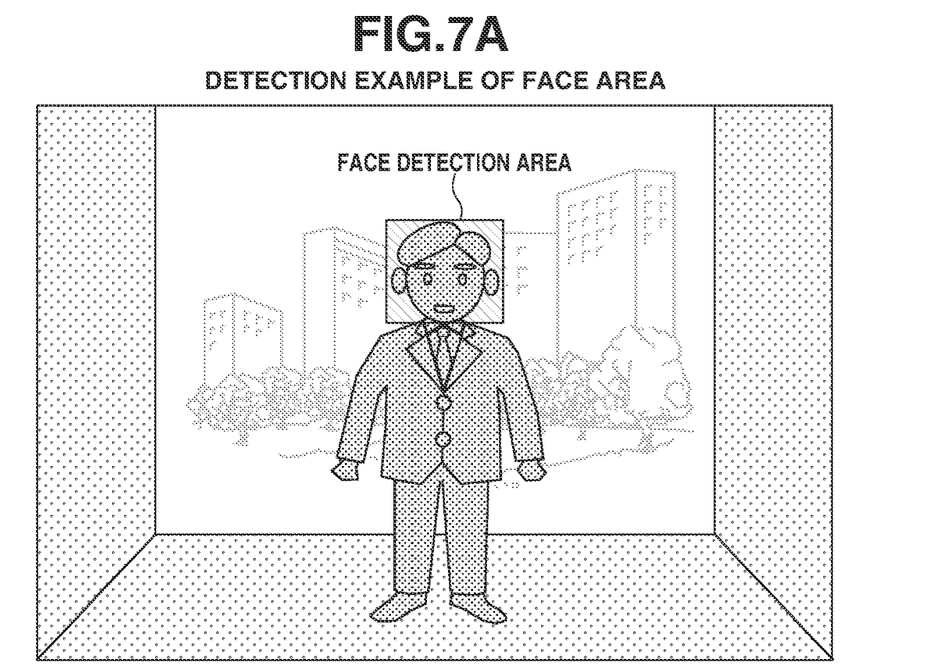
FIGS. 7A and 7B are diagrams respectively illustrating a face detection area and a human body detection area.
Figure 7B:
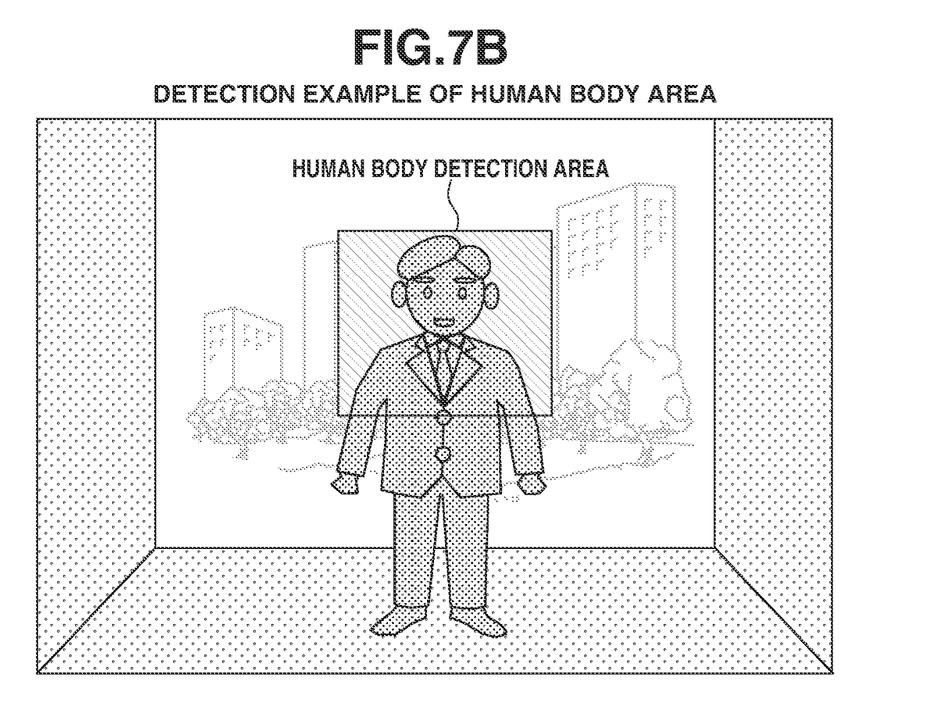

In the human body detection according to the present embodiment, it is not necessary to detect a whole body, and an upper body, a bust, or a head area including a face may be detected. FIGS. 7A and 7B respectively illustrate a detection example of the face area and a detection example of the human body area.

In a case where a pattern matching method is adopted as the object detection method, a pattern (classifiers) created by using statistical learning may be used as the pattern used in the pattern matching. Alternatively, the object may be detected by a method other than the pattern matching. For example, the object may be detected by using luminance gradient in a local area. In other words, the object detection method is not limited to a specific detection method, and various methods such as a detection method based on machine learning and a detection method based on distance information can be adopted.

In step S504, the object detection unit 406 determines whether a human body area is detected in the image by the human body detection processing performed in step S503. In a case where no human body area is detected (NO in step S504), the processing ends. In a case where the human body area is detected (YES in step S504), the processing proceeds to step S506.

In step S505, the exposure determination unit 407 sets the face area detected in step S501 as an area of interest to be used in subsequent step S507.

In step S506, the exposure determination unit 407 sets the human body area detected in step S503 as the area of interest to be used in subsequent step S507.

In step S507, the exposure determination unit 407 calculates an average luminance value of areas of interest set in step S505 or step S506. More specifically, the exposure determination unit 407 applies information about the number of areas of interest (number of detected faces or human bodies) set in step S505 or step S506, positions of the areas of interest, and sizes of the areas of interest, to an equation (1) described below.

$$\overline{I}_{object} = \frac{1}{f} \sum_{s=1}^{f} \left\{ \frac{1}{k_s \times l_s} \sum_{i=-k_s/2}^{k_s/2} \sum_{j=-l_s/2}^{l_s/2} I(v_s + i, h_s + j) \right\} \quad (1)$$

In the equation (1), I(x, y) represents a luminance value at a two-dimensional coordinate position (x, y) in a horizontal direction (x-axis direction) and a vertical direction (y-axis direction) in the image. In addition, f represents the number of areas of interest, (v, h) represents a central coordinate of each of the areas of interest, k represents a size of each of the areas of interest in the horizontal direction, and l represents a detected size of each of the areas of interest in the vertical direction.

In step S508, the exposure determination unit 407 determines an exposure value $EV_{correction}$ as an exposure target value based on the average luminance value calculated in step S507. First, the exposure determination unit 407 calculates a difference value between an average luminance value $I_{object}$ of the areas of interest calculated in step S507 and a target luminance value $I_{object\ target}$ of each area of interest as represented by an equation (2). For example, the target luminance value $I_{object\ target}$ of each area of interest may be arbitrary set by the user or set to a value that improves accuracy by comparing with authentication accuracy in face authentication.

$$\Delta Diff = I_{object\ target} - \overline{I}_{object} \quad (2)$$

Next, the exposure determination unit 407 determines the exposure value $EV_{correction}$ as represented by an equation (3). $EV_{current}$ is an exposure value in additive system of photographic exposure (APEX) conversion based on an object luminance value (brightness value), and is set based on a program diagram relating to exposure control stored in advance in the client apparatus 103.

$$EV_{correction} = \begin{cases} EV_{current} - \beta & \text{if } \Delta Diff < -Th \\ EV_{current} & \text{if } -Th \leq \Delta Diff \leq Th \\ EV_{current} + \beta & \text{if } Th < \Delta Diff \end{cases} \quad (3)$$

In the equation (3), a parameter β is a coefficient that influences a correction degree (speed) when exposure is corrected to an under side or an over side of the current exposure value $EV_{current}$. If the value of the parameter β is set large, processing speed (or time) until the exposure value reaches the exposure target value is increased; however, in a case where erroneous determination occurs in a detection result or in a case where detection of the object is unstable, brightness of the entire screen sharply changes. In contrast, if the value of the parameter β is set small, the processing speed (or time) until the exposure value reaches the exposure target value is decreased; however, the processing is robust to erroneous detection and the imaging condition. The parameter β is set as a correction value of the exposure to the current exposure value $EV_{current}$ in a case where a difference value ΔDiff is greater than or equal to a set threshold Th.

In step S509, the camera information acquisition unit 404 acquires information on the current exposure value from the monitoring camera 101.

In step S510, the exposure determination unit 407 communicates with the monitoring camera 101 via the communication control unit 402, and sets the exposure value calculated in step S508 to the monitoring camera 101.

In step S511, the object detection unit 406 performs the face detection processing in a manner similar to step S501.

In step S512, the object detection unit 406 determines whether a face area has been detected in the image by the face detection processing performed in step S511. In a case where a face area has been detected (YES in step S512), the processing proceeds to step S513. In a case where no face area has been detected (NO in step S512), the processing proceeds to step S514.

In step S513, the exposure determination unit 407 communicates with the monitoring camera 101 via the communication control unit 402, and sets the monitoring camera 101 to maintain (fix) the exposure value set in step S510. Then, the processing ends. More specifically, the exposure value is maintained until a face or a human body is detected again and the exposure target value is newly set.

In step S514, the exposure determination unit 407 communicates with the monitoring camera 101 via the communication control unit 402, and returns the exposure target value to the exposure value (exposure set value) acquired in step S509. Then, the processing ends. In other words, the exposure value set in step S510 is discarded. Then, the exposure control is performed while the exposure target value is successively updated based on the luminance value of the entire image. The luminance value is not necessarily the luminance value of the entire image, and luminance values of one or more areas (predetermined areas) set in advance in the image may be used. As described above, the imaging control system 100 according to the present embodiment performs the exposure control based on the face area or the human body area. In the case where the face is detected as a result, the exposure value is maintained. Maintaining the exposure value in the above-described manner makes it possible to maintain the exposure suitable for the face detection. For example, even in a state of strong backlight at a store entrance or a stadium gate using a glass door, it is possible to maintain the exposure value suitable for the face detection. Accordingly, it is possible to quickly capture a face of an object (person) such as a customer or a visitor.

In the present embodiment, the exposure control is performed based on the face area or the human body area. In the case where the face is not detected as a result, the exposure value is returned to the original exposure value. Thus, even in the case where the appropriate exposure control is not performed due to erroneous detection of the face or the human body, the exposure value is not maintained.

Second Embodiment

A second embodiment of the present invention is described below with reference to FIG. 6 and FIGS. 7A and 7B. In the present embodiment, a method of performing the exposure control more suitable for recognition of the face is described. After the exposure control is performed based on the human body area according to the first embodiment, the exposure control is performed again based on the face area.

Configurations and processing similar to the configurations and the processing according to the first embodiment are denoted by the same reference numerals, and detailed descriptions thereof are omitted.

Figure 6:
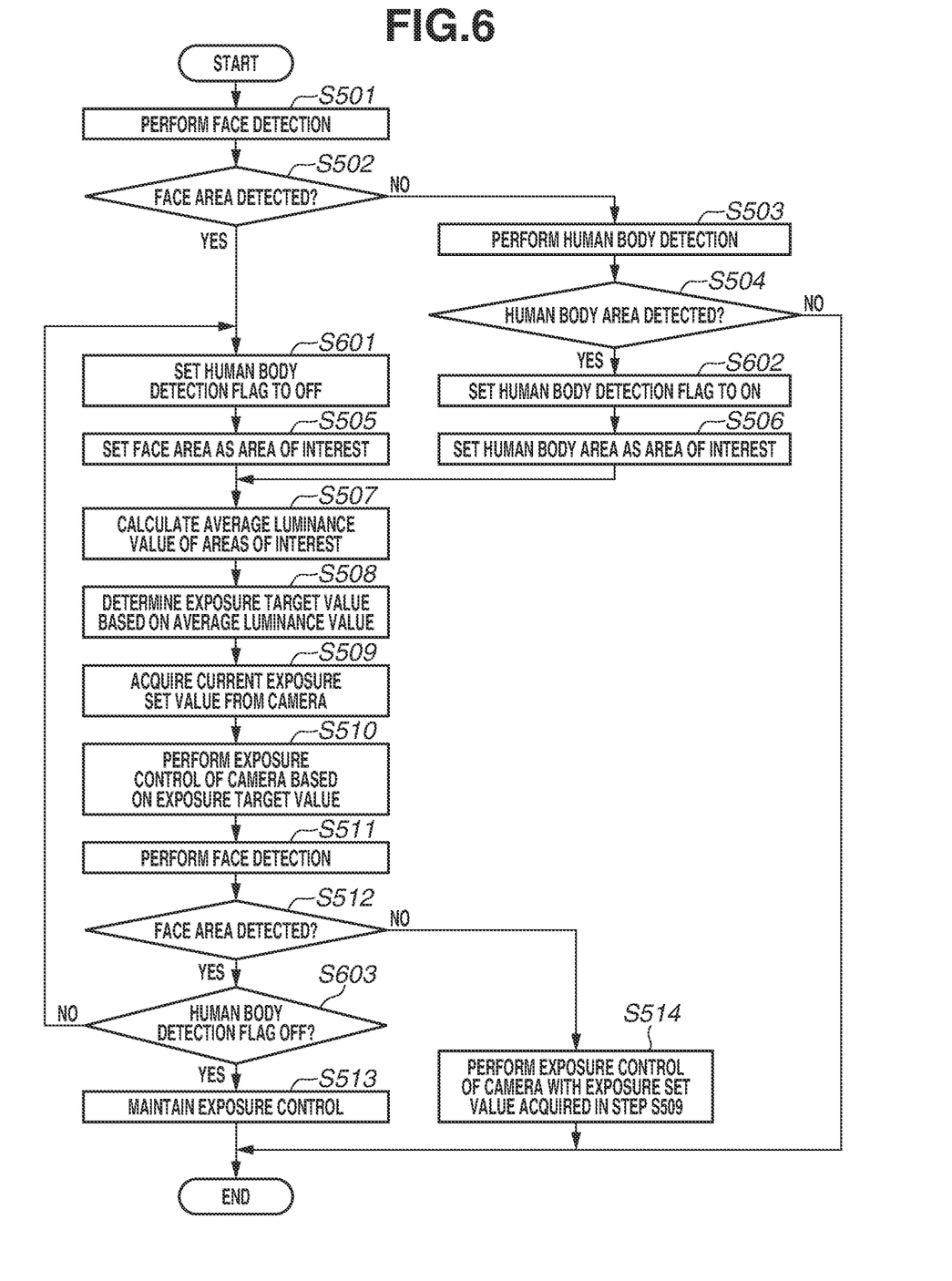
FIG. 6 is a flowchart illustrating exposure control processing according to a second embodiment.

FIG. 6 is a flowchart according to the present embodiment. Hereinafter, exposure control processing according to the present embodiment is described with reference to the flowchart illustrated in FIG. 6. The processing start timing is similar to the processing start timing in the first embodiment. Thus, description thereof is omitted. Further, the processing in steps S501 to S514 is similar to the processing in steps S501 to S514 in the first embodiment. Thus, description of the processing is omitted.

In step S601, the exposure determination unit 407 sets a human body detection flag representing detection of the human body to off. The processing is performed in the case where it is determined in step S502 that a face is detected. In and after subsequent step S505, the exposure control is performed based on the face area as described in the first embodiment.

In step S602, the exposure determination unit 407 sets the human body detection flag representing detection of the human body to on. The processing is performed in a case where it is determined in step S504 that a human body is detected. In and after subsequent step S506, the exposure control is performed based on the human body area as described in the first embodiment.

In step S603, the exposure determination unit 407 determines whether the human body detection flag is off. In a case where the human body detection flag is off (YES in step S603), the processing proceeds to step S513. Otherwise, namely, in a case where the human body detection flag is on (NO in step S603), the processing proceeds to step S601. In other words, since the human body detection flag is off in the case where the exposure control is performed based on the face area, the processing proceeds to step S513, and the exposure control (exposure value) is maintained. Then, the processing ends. In contrast, in the case where the exposure control is performed based on the human body area, the human body detection flag is on. Thus, the processing returns to step S601, and the exposure control based on the face area is performed. In this case, in step S505, the face area detected in step S511 is set as the area of interest.

As illustrated in FIGS. 7A and 7B, the human body area may include an area other than the face such as an area of clothing. Thus, in the case where the exposure value based on the human body area is maintained as in the first embodiment, although there are advantages that the processing is simple and responsiveness is excellent, the exposure may not be necessarily suitable for the face area.

In the second embodiment, the exposure control is performed based on the human body area, and in the case where the face is detected as a result, the exposure control is performed again based on the face area. Performing the processing according to the present embodiment makes it possible to set the exposure suitable for the face area. This allows for maintenance of the exposure more suitable for recognition of the face.

Third Embodiment

A third embodiment of the present invention is described below with reference to FIGS. 8A and 8B. As described above, in the first embodiment and the second embodiment, the exposure value suitable for the face detection can be maintained. However, for example, in a case where a face or a human body is not detected for a long time in a store having the small number of customers, and brightness inside and outside the store changes with time or due to weather or change of lighting, the maintained exposure value may not be suitable for the face detection. In particular, in a case where the brightness is largely changed so that a backlight state and a follow light state are switched, maintenance of the exposure value may cause overexposure or underexposure of the face or the human body, which may largely deteriorate detection accuracy.

Thus, in the present embodiment, a method in which the maintenance of the exposure value is canceled based on the change in brightness of the imaging environment is described. Configurations and processing similar to the configurations and the processing according to the first and second embodiments are denoted by the same reference numerals, and detailed descriptions thereof are omitted.

Figures 8, 8A:
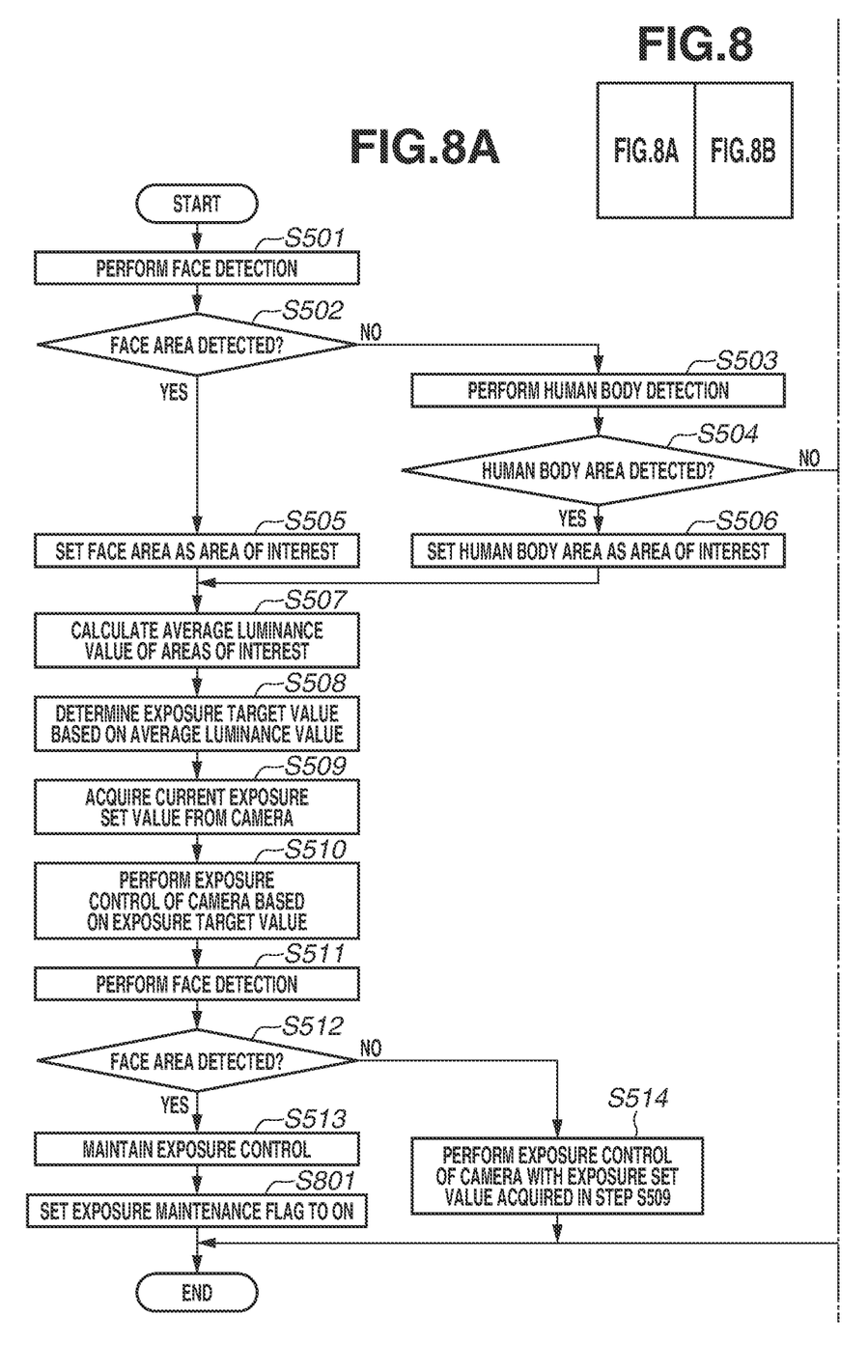
FIGS. 8A and 8B are a flowchart illustrating exposure control processing according to a third embodiment.
Figure 8B:
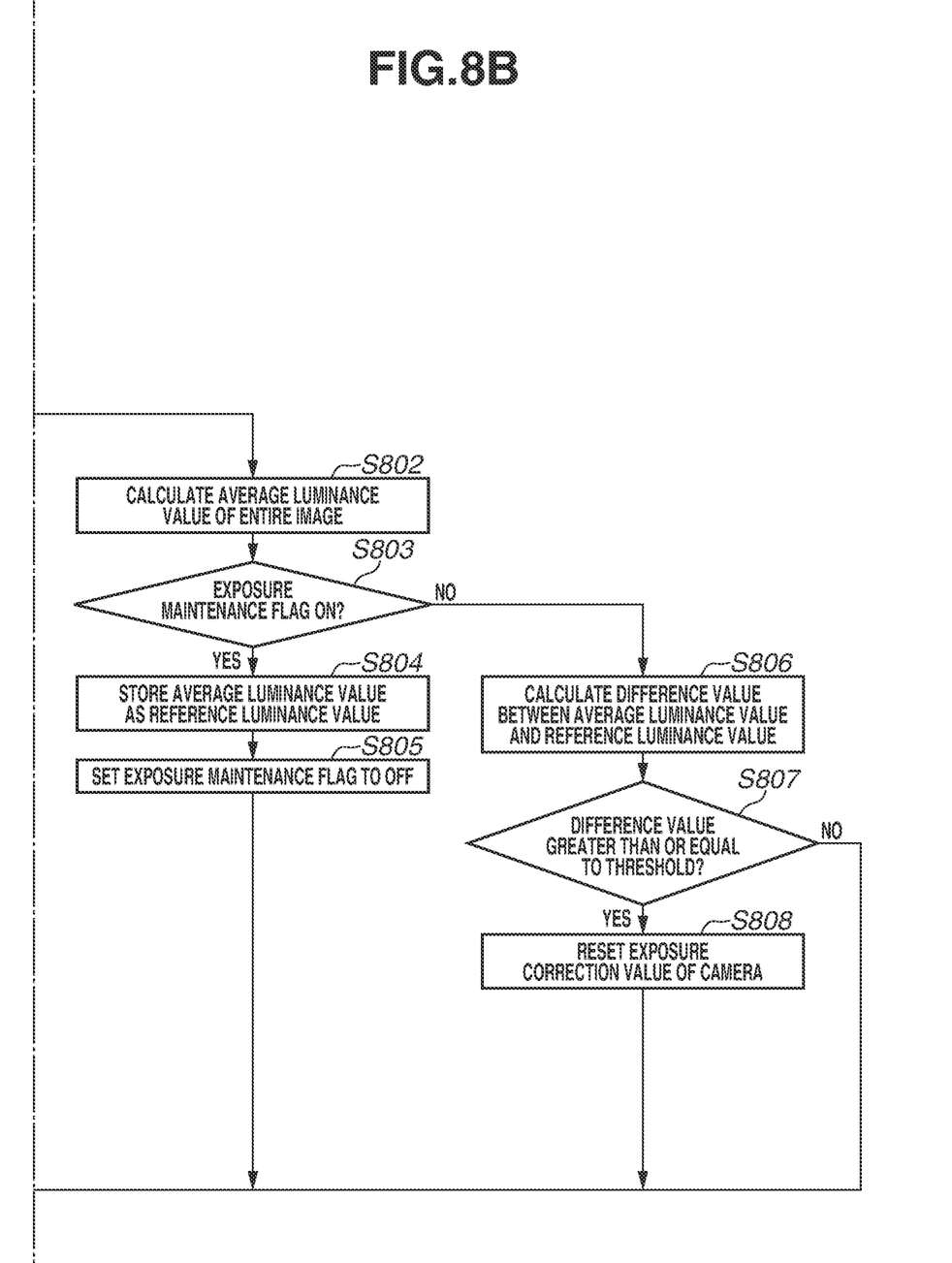

FIGS. 8A and 8B are a flowchart according to the present embodiment. Hereinafter, exposure control processing according to the present embodiment is described with reference to the flowchart illustrated in FIGS. 8A and 8B. The processing start timing is similar to the processing start timing in the first embodiment. Thus, description thereof is omitted. Further, the processing in steps S501 to S514 is similar to the processing in steps S501 to S514 in the first embodiment. Thus, description of the processing is omitted.

In step S801, the exposure determination unit 407 sets an exposure maintenance flag representing maintenance of the exposure control to on. The exposure maintenance flag is a static variable, and contents of the exposure maintenance flag are carried over to next exposure control processing.

In step S802, the exposure determination unit 407 calculates an average luminance value of the entire screen. The processing is performed in a case where the determination results in step S502 and in step S504 are both no. In other words, the average luminance value of the entire screen is calculated in a state where neither a face nor a human body is detected and no object person is present.

In step S803, the exposure determination unit 407 determines whether the exposure maintenance flag is on. In a case where the exposure maintenance flag is on (YES in step S803), the processing proceeds to step S804. Otherwise (NO in step S803), the processing proceeds to step S806.

In step S804, the exposure determination unit 407 stores the average luminance value of the entire screen calculated in step S802 as a reference luminance value (reference value). The reference luminance value is a static variable, and contents of the reference luminance value are carried over to the next exposure control processing.

In step S805, the exposure determination unit 407 sets the exposure maintenance flag to off. Then, the processing ends.

On the other hand, in step S806, the exposure determination unit 407 calculates a difference value between the average luminance value of the entire screen calculated in step S802 and the reference luminance value stored in step S804. In the present embodiment, in a case where the processing in step S804 has never been performed before, the difference value is zero.

In step S807, the exposure determination unit 407 determines whether the difference value calculated in step S806 is greater than or equal to a preset threshold. In a case where the difference value is greater than or equal to the preset threshold (YES in step S807), the processing proceeds to step S808. Otherwise (NO in step S807), the processing ends. The threshold is preferably set, for example, based on a range of the average luminance value detectable by the object detection unit 406 that is determined by capturing in advance various brightness patterns of the face and the human body by the monitoring camera 101 while changing exposure setting and illumination.

In step S808, the exposure determination unit 407 communicates with the monitoring camera 101 via the communication control unit 402, and resets the exposure value of the monitoring camera 101 to a prescribed value held by the monitoring camera 101. Then, the processing ends. To reset the exposure value, for example, the exposure value $EV_{correction}$ in the equation (3) may be set to zero.

As described above, in the third embodiment, the maintenance of the exposure value is canceled based on the change in brightness of the imaging environment. Performing the processing according to the present embodiment makes it possible to reset the exposure value even in the case where the brightness of the imaging environment is largely changed. This makes it possible to prevent a decrease in the detection accuracy of the face or the human body.

In the present embodiment, the example based on the first embodiment has been described to simplify the description; however, the present embodiment can also be combined with the second embodiment. In this case, the processing in step S801 is performed after the processing in step S513 in the second embodiment, and the processing in steps S802 to S808 is performed in the case where the determination result in step S504 is no.

Further, in the present embodiment, the method using the average luminance value of the entire screen has been described; however, the method is not limited thereto. For example, a weighted average luminance value obtained by weighting each of the areas where the face or the human body is detected, or an average luminance value of areas near the areas where the face or the human body is detected may be used.

Fourth Embodiment

In the above-described embodiments, the example is described where the exposure value is maintained in the case where the face is detected after the exposure control. However, depending on the conditions such as a field angle (imaging range) of the camera and moving speed of the object, the object may go out of the field angle (imaging range) before the face detection processing is performed. In this case, the exposure value of the exposure control performed based on luminance of the area of interest (face or human body) is not maintained.

In a fourth embodiment, in a case where face confirmation processing is not valid (invalid), the exposure value is maintained irrespective of presence/absence of the face detection. Configurations and processing similar to the configurations and the processing according to the above-described embodiments are denoted by the same reference numerals, and detailed descriptions thereof are omitted.

Figure 9:
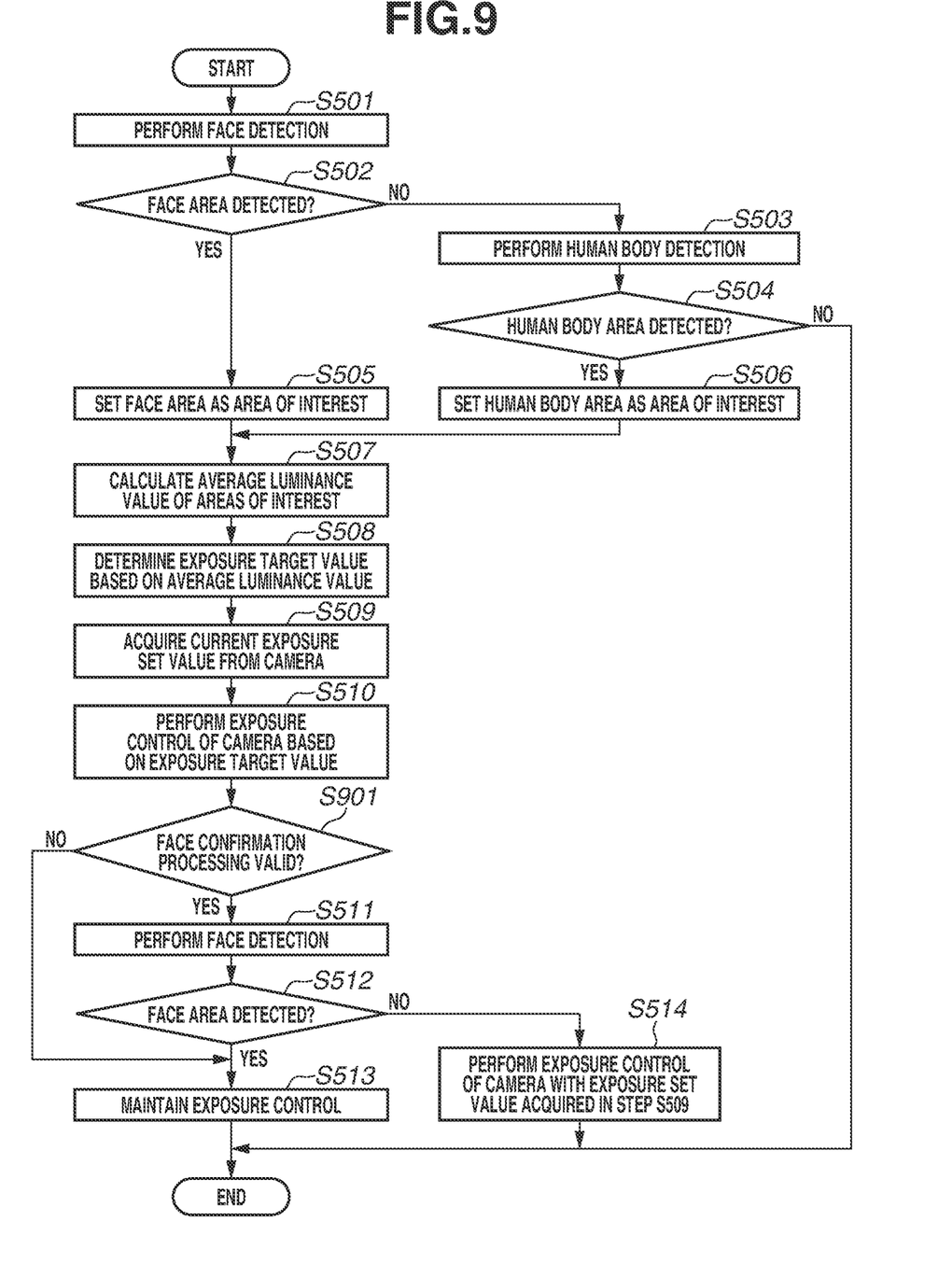
FIG. 9 is a flowchart illustrating exposure control processing according to a fourth embodiment.

FIG. 9 is a flowchart according to the present embodiment. Hereinafter, exposure control processing according to the present embodiment is described with reference to the flowchart illustrated in FIG. 9. The processing start timing is similar to the processing start timing in the first embodiment. Thus, description thereof is omitted. Further, the processing in steps S501 to S514 is similar to the processing in steps S501 to S514 in the first embodiment. Thus, description of the processing is omitted.

In step S901, the exposure determination unit 407 determines whether the face confirmation processing is valid. The face confirmation processing refers to the face detection processing performed on the image after the exposure control performed in step S510. In a case where the face confirmation processing is valid (YES in step S901), the processing proceeds to step S511, and the face confirmation processing is performed in steps S511 and S512. In contrast, in a case where the face confirmation processing is not valid (NO in step S901), the processing proceeds to step S513, and the exposure value is maintained (exposure is fixed). In other words, the exposure value is maintained in a case where a predetermined condition is satisfied. The predetermined condition is the case where the face confirmation processing is invalid (NO in step S901), or the case where the face confirmation processing is valid and the face area is detected (YES in step S512).

The face confirmation processing is preferably set invalid when the object goes out of the field angle (imaging area) before the face confirmation processing is completed because of a condition such as an installation state of the camera, the field angle (imaging range) of the camera, and the moving speed of the object. Otherwise, the face confirmation processing is preferably set valid.

The face confirmation processing can be automatically set based on a ratio of presence/absence of the face detection in step S512. For example, in a case where a ratio of presence of the face detection is small, the environment is determined as an environment in which the object easily goes out of the field angle, and the face confirmation processing is set invalid. Otherwise, the face confirmation processing is set valid.

The exposure fixed in step S513 is maintained until a face or a human body is newly detected. In other words, the fixed exposure is canceled when a face or a human body is newly detected. The fixing of the exposure may be canceled after a predetermined time has elapsed from start of the fixing (maintenance) of the exposure. After the fixing of the exposure is canceled, the exposure value is calculated based on luminance of a predetermined area of the captured image (e.g., entire image or area near center of image), and the exposure control is performed.

OTHER EMBODIMENTS

In the above-described embodiments, the example in which the face or the human body is detected has been described; however, a detected object is not limited thereto. A specific object, for example, an automobile and a number plate thereof may be detected.

In the above-described embodiments, the example in which the exposure control of the monitoring camera 101 is performed by the client apparatus 103 via the network 102 has been described; however, the exposure control may be performed by the monitoring camera 101.

A program (software) implementing a part or all of the control and the functions of the above-described embodiments may be supplied to an imaging apparatus or an information processing apparatus via a network or various kinds of recording media. Further, a computer (or CPU or MPU) of the imaging apparatus or the information processing apparatus may read out and execute the program. In this case, the program and the storage medium storing the program constitute each of the embodiments of the present invention.

A part or all of the control of the embodiments may be implemented by a circuit (e.g., application specific integrated circuit (ASIC)) that implements one or more functions.

While the embodiments of the present invention have been described above, the present invention is not limited to the embodiments, and various modifications and alternations can be made within the scope of the present invention.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to embodiments, it is to be understood that the disclosure is not limited to the disclosed embodiments, but is determined by the scope of the following claims.

This application claims the benefit of Japanese Patent Applications No. 2020-045744, filed Mar. 16, 2020, and No. 2020-181986, filed Oct. 30, 2020, which are hereby incorporated by reference herein in their entirety.

What is claimed is:

1. An information processing apparatus, comprising: at least one processor; and a memory coupled to the at least one processor, the memory having instructions that, when executed by the processor, performs operations as: an acquisition unit configured to acquire a captured image; a human body detection unit configured to detect a human body area from the captured image; a first exposure determination unit configured to determine exposure based on luminance of the human body area detected by the human body detection unit; a face detection unit configured to detect a face area from an image captured at the exposure determined by the first exposure determination unit: and a second exposure determination unit configured to determine exposure based on luminance of the face area detected by the face detection unit and to maintain the exposure until a predetermined condition is satisfied, wherein the predetermined condition includes that, after the exposure is determined by the second exposure determination unit, a human body area is detected again by the human body detection unit or a face area is detected again by the face detection unit.

2. The information processing apparatus according to claim 1, wherein the second exposure determination unit is configured to, when a predetermined time passes in a state where neither the face area nor the human body area is detected after maintenance of the exposure is started, cancel the maintenance of the exposure and newly determine exposure based on luminance of a predetermined area of the captured image.

3. The information processing apparatus according to claim 2, further comprising:
a storage unit configured to store average luminance of the predetermined area of the image as a reference value in a case where neither the face area nor the human body area is detected by the face detection unit or the human body detection unit after the second exposure determination unit starts maintenance of the exposure; and
a calculation unit configured to calculate a difference value between current average luminance of the predetermined area and the reference value in a case where, after the storage unit stores the reference value, neither the face area nor the human body area is detected by the face detection unit or the human body detection unit again,
wherein the second exposure determination unit is configured to, in a case where the difference value calculated by the calculation unit is greater than or equal to a threshold, cancel the maintenance of the exposure and newly determine exposure based on luminance of the predetermined area of the captured image.

4. The information processing apparatus according to claim 2, wherein the predetermined area is an entire area of the captured image.

5. The information processing apparatus according to claim 2, wherein the predetermined area is an area near a center of the captured image.

6. The information processing apparatus according to claim 1, wherein the first exposure determination unit is configured to determine the exposure so that a difference between the luminance of the human body area detected by the human body detection unit and target luminance falls within a predetermined range.

7. The information processing apparatus according to claim 1, wherein the second exposure determination unit is configured to determine the exposure so that a difference between the luminance of the face area detected by the face detection unit and target luminance falls within a predetermined range.

8. The information processing apparatus according to claim 1, wherein the human body area is any of a whole body, an upper body, a bust, and a head area including a face.

9. An imaging apparatus comprising the information processing apparatus according to claim 1.

10. A method comprising:
acquiring captured image;
detecting a human body area from the captured image;
determining exposure based on luminance of the detected human body area;
detecting a face area from an image captured at the determined exposure; and
determining exposure based on luminance of the detected face area and maintaining the exposure until a predetermined condition is satisfied,
wherein the wherein the predetermined condition includes that, after the exposure is determined based on the luminance of a face area, the human body area is detected again or a face area is detected again.

11. The method according to claim 10 wherein, when a predetermined time passes in a state where neither the face area nor the human body area is detected after maintenance of the exposure is started, the maintenance of the exposure is canceled, and exposure is newly determined based on luminance of a predetermined area of the captured image.

12. A non-transitory computer-readable storage medium storing a program for causing a computer to execute a method according to claim 11.

\* \* \* \* \*